No. 678,037. Patented July 9, 1901.
V. ROYLE.
BEVELING MACHINE.
(Application filed Apr. 12, 1900.)
(No Model.) 2 Sheets—Sheet 1.

Witnesses: Inventor
George Barry Jr. Vernon Royle
Edward Vester By Brown & Seward
 his Attorneys No. 678,037. Patented July 9, 1901.
V. ROYLE.
BEVELING MACHINE.
(Application filed Apr. 12, 1900.)
(No Model.) 2 Sheets—Sheet 2.
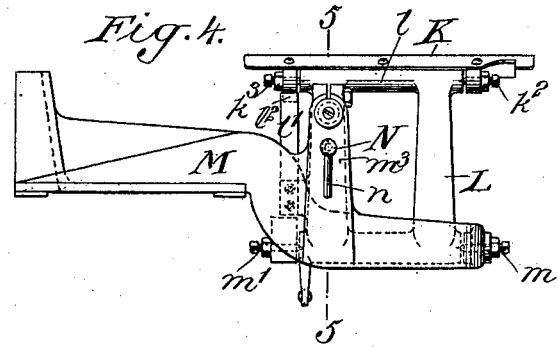
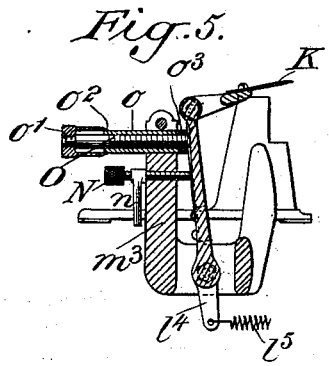
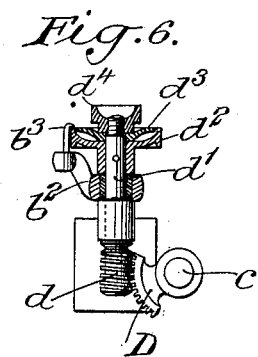
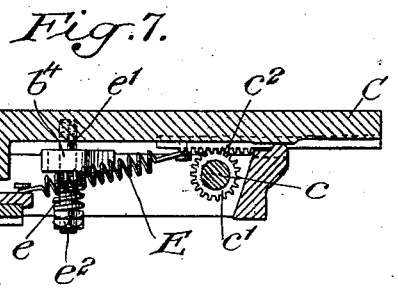
Witnesses:—
George Barry Jr
Edward Vieser
Inventor:—
Vernon Royle
By Brown & Seward
his Attorneys

UNITED STATES PATENT OFFICE.

VERNON ROYLE, OF PATERSON, NEW JERSEY.

BEVELING-MACHINE.

SPECIFICATION forming part of Letters Patent No. 678,037, dated July 9, 1901.

Application filed April 12, 1900. Serial No. 12,620. (No model.)

*To all whom it may concern:*

Be it known that I, VERNON ROYLE, a citizen of the United States, and a resident of Paterson, in the county of Passaic and State of New Jersey, have invented a new and useful Beveling-Machine, of which the following is a specification.

My invention relates to beveling-machines, and more particularly to what is known in the art as a "lining-beveler" for beveling the edge and cutting the face of a plate for printing purposes.

A practical embodiment of my invention is represented in the accompanying drawings, in which—

Figure 1:
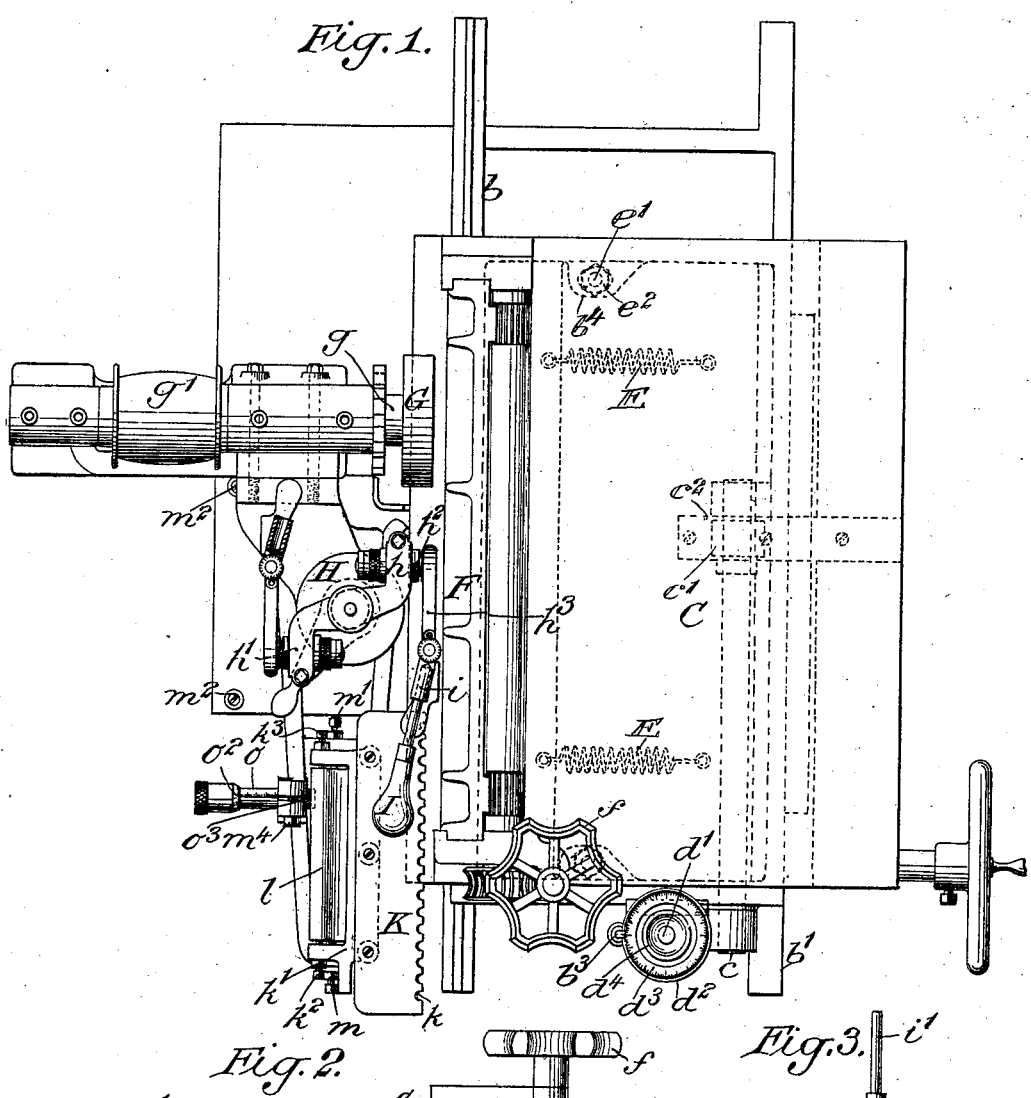
Figures 2, 3:
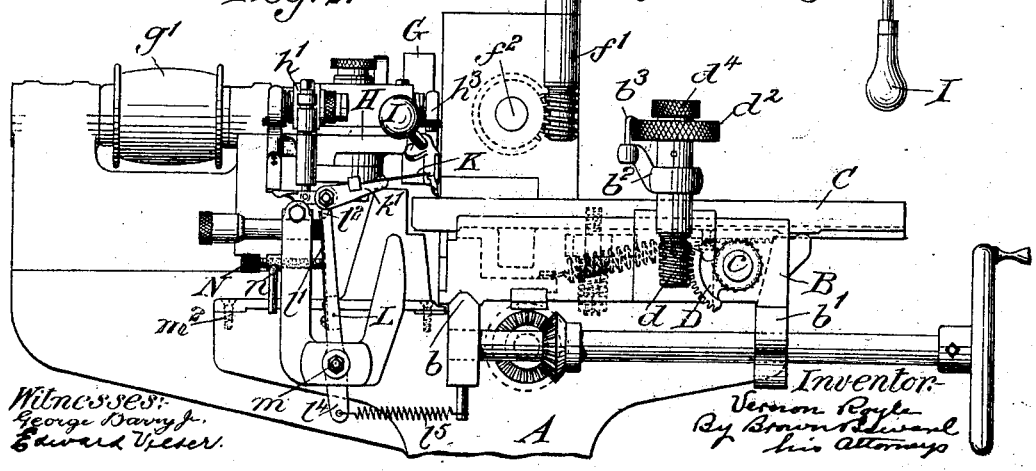

Figure 1 represents the top plan view of the machine. Fig. 2 is an end view of so much of the machine as is required to illustrate my invention. Fig. 3 is a view in detail of the handle for manipulating the graver-cutter. Fig. 4 is a view in detail showing in side elevation the removable bracket which carries the adjustable gage for indicating the line of cut. Fig. 5 is a transverse section of the same along the line 5 5 of Fig. 4. Fig. 6 is a view in detail showing in vertical section the micrometer mechanism for adjusting the table; and Fig. 7 is a vertical transverse section through the table and carriage, showing the means for holding the table yieldingly on the carriage and for taking up lost motion in connection with the micrometer adjustment mechanism.

The top of the pedestal which forms the bed-plate for supporting the several parts of the machine is denoted by A.

The carriage B is mounted upon suitable ways $b\ b'$ to move back and forth on the bedplate A to carry the plate to be operated upon into engagement with the beveling cutter or cutters and the lining-cutter or graver. The plate to be operated upon is supported on a table C, carried by the carriage B, and while having a movement bodily along with the carriage also has a limited movement transversely of the carriage, this limited transverse movement for adjusting the table to a fine degree of accuracy being under the control of a micrometer mechanism, as follows:
A shaft $c$ is mounted in suitable bearings in the carriage B and extends from the front of the carriage to a point preferably beyond the center of the table C and is provided with a spur-wheel or pinion $c'$, which engages a rackbar $c^2$, located on the under side of the table C, preferably at or near the middle portion of the table. At its front end the shaft $c$ is provided with a segment-gear D, fixed to rotate with the shaft, which gear D is arranged to engage a worm $d$ on a short vertical shaft $d'$. The shaft $d'$ is mounted in a bracket $b^2$, fixed to the carriage B, and is provided with a knurled thumb-wheel $d^2$ for convenience in turning it. The wheel $d^2$ is provided with a concave face in which is seated and loosely mounted on the shaft $d'$ a disk $d^3$, provided with graduations for determining the amount of movement of the shaft $d'$, and hence through the sector D of the shaft $c$, which in turn through the spur-wheel $c'$ and rack-bar $c^2$ determines the movement of the table C toward and away from the beveling and graver cutters. The graduated disk $d^3$ is clamped to the wheel $d^2$ to turn together therewith by means of a nut $d^4$, having a screw-threaded engagement with the upper end of the shaft $d'$. A stationary index-finger $b^3$ is fixed to the bracket $b^2$, with its point in convenient proximity to the graduated scale on the periphery of the disk $d^3$. The arrangement of the disk $d^3$ to be moved by loosening the nut $d^4$ independent of the wheel $d^2$ and shaft $d'$ is for the purpose of setting the disk $d^3$ in position, with its zero-point at the index-finger $b^3$, without disturbing the table after the latter has been moved to its limit toward the cut. For the purpose of taking up all lost motion between the rack-bar $c^2$ and pinion $c'$ and between the sector D and worm $d$, I provide a pair of springs E, in the present instance spiral springs, having one end secured to the under side of the table C and their opposite end to the carriage B. These springs tend to hold the table at the limit of its forward adjustment toward the cutter or cutters, so that its movement in the opposite direction, whatever there is, will be entirely due to the result of the worm $d$ and may be accurately determined by the micrometer-disk $d^3$, which is graded with relation to the distance between two consecutive teeth on the worm. To further provide for holding the table securely on the carriage against liability to tilt from its bearings, I employ springs $e$, which surround pins $e'$, projecting downwardly through slots in the ears $b^4$ on the carriage B, the springs being inserted between the under side of the ears $b^4$ and a nut $e^2$ on the lower end of the pin. The clamp F for holding the plate in position on the table C and operated by the wheel $f$ on the worm-shaft $f'$, engaging a pinion-shaft $f^2$, mounted in suitable bearings on the table, is quite similar in all respects to that heretofore in use and forms specifically no part of my present invention. The position of the head for carrying the beveling cutter or cutters is denoted by G on the shaft $g$, mounted in suitable bearings on the bed A and provided with a pulley $g'$ for imparting rotary motion thereto from a source of power. (Not shown.) These parts, as well as the turret H, supported from the standard which supports the drive-shaft and carrying the support-arms $h\ h'$ for holding the adjustable bearings $h^2$, in which the vertically-rocking tool-holder $h^3$ is mounted, are quite similar in their general structure and arrangement to the corresponding parts shown, described, and claimed in Letters Patent No. 641,470, granted to me on the 16th day of January, 1900, and, with the exception of the removable handle for manipulating the graver-support $h^3$, form specifically no part of my present invention.

For the purpose of pressing the tool into the surface of the plate to the desired depth, I have provided in addition to the usual thumb-piece a removable handle I, suitable for receiving the grasp of the hand of the operator, and have provided the tool-holder $h^3$ with a socket $i$ for receiving the shank $i'$ of the handle whenever it is desired to operate the tool for making deeper cuts, the arrangement being such that the handle I may be inserted in position to afford the proper purchase to easily force the tool into the surface and removed from its socket in a moment's time at pleasure, thereby utilizing one handle for each of the two or more tool-supports, which may be swung into cutting position without permanently increasing their length to an awkward extent, which might interfere with the operation of other parts of the machine.

To adjust the plate on the table C in position to receive one or more lining cuts, which shall have the desired relation to the inside border-line of the engraving and also with respect to the beveled edge of the plate, I provide an adjustable gage as follows: The gage proper consists of a thin plate K, having its operating edge serrated, as shown at $k$. The plate K is secured to a support $k'$, bifurcated at its rear end to embrace the socket $l$ in the top of a rocking arm L. The support $k'$ is held in rocking position in the top of the arm L by means of point-bearings $k^2\ k^3$, arranged to engage shallow tapered sockets in the opposite ends of the socket-piece $l$, hereinabove referred to, and the said gage-plate K is held normally in a position above the surface of the table by means of a spring $l'$, fixed to the back of the arm L, with its free end in position to engage a toe-piece $l^2$, depending from the support $k'$. The rocking arm L is preferably made in skeleton form, its lower end being secured by means of point-bearings $m\ m'$ (see Fig. 4) to the forward end of a bracket M, which extends from the bed A forwardly and downwardly along the inner edge of the carriage B and table C. The said bracket B is made removable from the bed A by means of suitable screws $m^2$. The said bracket is preferably made of skeleton formation to permit the pivot of the rocking arm or support L to be located centrally in the bottom of its front portion and also to permit the passage of an extension $l^4$ on the rocking arm below the pivotal support for the attachment of a spring $l^5$ to hold the arm normally away from the edge of the plate against the micrometer-screws for adjusting it.

In the use of a machine of this character the beveling-cutters when removed for grinding and again adjusted for use assume a line of cut slightly different from the line which they cut before they were ground, and it becomes important to adjust the gage K to this new line of cut, which for convenience I call the "zero-line." To accomplish this, I provide an adjusting-screw N, which engages a screw-threaded perforation through the wall of an uprising portion $m^3$ of the bracket M and extends into engagement with the back of the rocking support L. This screw N is intended to hold the arm L at all times in position, so that the free edge of the gage will indicate the line of cut—$i.\ e.$, the zero-line—and as the zero-line, for reasons which I have above stated, changes at each grinding of the set of beveling-cutters the screw N moves the gage up to or back to a new zero-line, and is there locked in the present instance by a suitable tail-nut $n$.

To adjust the gage K with respect to the zero-line for the purpose of indicating the position on the margin of the plate where the graver-cutter shall engage it, I provide a micrometer-screw O, which works within an interiorly-screw-threaded sleeve $o$ and is operated by means of a hollow cap $o'$, the edge $o^2$ of which traverses the exterior graded portion of the sleeve $o$ and determines the amount of distance which the screw O pushes the rocking arm L, and hence the gage K, over the margin of the plate. To further provide for adjusting the gage when set at zero to the position which the arm L occupies under the varying zero adjustments of the screw N, I locate the sleeve $o$, which holds the micrometer-screw, in a split socket in the top of the arm $m^3$, where it may be clamped by means of a clamp-screw $m^4$. A jam-nut $o^3$ on the inner end of the screw O serves to lock the latter in its adjusted position.

The gage K and the micrometer table adjustment may either be utilized singly for moving the plate into different positions relatively to the cutters, but they have an important action conjointly in the following manner: Suppose, for example, it be required to provide a plurality of graver-cuts near the margin of the plate. The gage K is first adjusted to zero by running a trial-plate into engagement with the beveling-cutters and then bringing the edge of the plate K up to this cut and operating the screw N to hold the gage in that position. The micrometer-screw O is then set to zero and bodily moved forward until it just contacts with the arm L when the latter bears against the inner end of the zero-screw N. Suppose the graver-cut is to be an eighth of an inch in width, leaving a printing margin of a sixteenth of an inch between it and a succeeding cut. The micrometer-screw O will be operated to set the gage K forward an eighth and a sixteenth. The trial-plate being removed from the table and the plate to be operated upon having been placed upon the table with the latter moved toward the cutters to the limit of its movement and the micrometer-adjuster set with the gage $d^3$, having its zero-mark at the index-finger $b^3$ and the free edge of the gage K on the inner line at the border of the engraving, the graver-cutter, carried by the arm $h^3$, having been set forward to correspond with the advanced position of the edge of the gage K—i. e., under the present conditions an eighth and sixteenth—it follows that the graver-cutter will cut from the margin of the engraving for an eighth of an inch and that the beveling-cutter, assuming it were to be brought into action, would cut on a line a sixteenth of an inch still farther toward the edge of the plate, thereby leaving a printing-line a sixteenth of an inch in width; but instead of operating the beveling-cutter at this moment I leave the beveling-cutter out of action and form a cut with the graver-cutter. Then utilizing the micrometer table-adjuster I advance the table away from the cutter another eighth and one-sixteenth of an inch and again pass the plate into engagement with the graver-cutter and, if two marginal lines are required, set the beveling-cutter in action, so that the beveling cut will be made within a sixteenth of an inch of the second graver cut, thus leaving two marginal printing-lines on the plate, with a graver cut intermediate of the margin of the engraving and the first printing-line, a second graver cut between the two lines, and a beveling cut exterior to the outer line. The plate may then be turned at right angles to its former position, and without any further adjustment of the gage K, but simply a return of the table to its position toward the cutters, the same operation may be repeated at the end of the plate, and so on with the opposite side and opposite end, thereby making the printing-lines correspond throughout the entire margin of the plate with but a single adjustment of the gage K. By means of the removable bracket, forming a support for the gage, as hereinabove set forth, the latter may be removed from the machine when the table and its micrometer-adjusting mechanism are alone sufficient to perform the work in hand.

What I claim is—

1. The combination with means for holding the plate to be operated upon in position and a cutter for operating upon the plate, of a gage for indicating the line of cut and a substantially upright rocking support for the gage, substantially as set forth.

2. The combination with means for holding the plate to be operated upon in position and a cutter for operating upon the plate, of a gage for indicating the line of cut, the said gage being mounted in rocking adjustment in a rocking support, substantially as set forth.

3. The combination with the gage and its substantially upright, rocking support, the gage being mounted in rocking adjustment on its support, of a spring for holding the gage normally above the face of the plate, substantially as set forth.

4. The combination with the gage and its substantially upright rocking support, of means for adjusting the gage to varying lines of cut and a spring for holding the gage-support normally in engagement with said adjusting means, substantially as set forth.

5. The combination with the gage and means for setting it to the line of cut, of a micrometer adjusting device for setting the gage at different distances beyond the line of cut, substantially as set forth.

6. The combination with the gage and its support, of means for setting the gage at different lines of cut, a micrometer adjusting device for adjusting the gage different distances beyond the line of cut and means for moving the micrometer adjusting device bodily to adjust its zero-point to the zero-line or line of cut, substantially as set forth.

7. The combination with a suitable plate-support, of a movable arm for holding the graver-tool the said arm being provided with a thumb-piece for operating it and a removable handle for exerting pressure upon the graver-tool independently of the thumb-piece, substantially as set forth.

8. In a lining-beveler, the combination with the table for supporting a plate in position to be operated upon, of a micrometer adjustment for the table comprising a worm, a sector in engagement with the worm, a shaft mounted to rotate with the sector, a pinion on the shaft and a rack-bar fixed to the table in position to engage the said pinion, substantially as set forth.

9. In a lining-beveler the combination with the table, the worm-shaft and means for transmitting motion from the worm-shaft to the table, of a graduated disk on the worm-shaft and means for clamping the said disk in different rotary adjustments on the shaft, substantially as set forth.

10. In a lining-beveler the combination with the table, the worm-shaft, means for transmitting motion from the worm-shaft to the table, of an index-finger secured to the worm-shaft support, a graduated disk mounted on the worm-shaft and means for clamping the said disk in different rotary adjustments on the worm-shaft relatively to the index-finger, substantially as set forth.

11. In a lining-beveler the combination with the table for holding the plate in position to be operated upon, of a cutter for operating upon the plate, and a micrometer adjusting device for operating the table and plate thereon, a gage and a micrometer adjustment for the gage, substantially as set forth.

12. In a lining-beveler the combination with the table for supporting the plate to be operated upon, a cutter, and means for adjusting the table and plate thereon toward and away from the cutter, of a gage and a removable bracket forming a support for the gage, substantially as set forth.

In testimony that I claim the foregoing as my invention I have signed my name, in presence of two witnesses, this 14th day of March, A. D. 1900.

VERNON ROYLE.

Witnesses:
HEBER ROYLE,
D. B. VAN BUREN.